United States Patent [19]
Seo et al.

[11] Patent Number: 5,554,079
[45] Date of Patent: Sep. 10, 1996

[54] GEAR TRAIN OF AN AUTOMATIC FIVE-SPEED TRANSMISSION FOR A VEHICLE

[75] Inventors: Taeseok Seo; Donghoon Park, both of Kyungki-do, Rep. of Korea

[73] Assignee: Hyundai Motor Company, Seoul, Rep. of Korea

[21] Appl. No.: 418,026

[22] Filed: Apr. 6, 1995

[30] Foreign Application Priority Data

Apr. 6, 1994 [KR] Rep. of Korea ........................ 94-7191
Apr. 6, 1994 [KR] Rep. of Korea ........................ 94-7195

[51] Int. Cl.⁶ .................................................. F16H 3/62
[52] U.S. Cl. ............................................................ 475/207
[58] Field of Search ............................................. 475/207

[56] References Cited

U.S. PATENT DOCUMENTS 3,094,012 6/1963 Ferguson ................................. 475/207
4,924,729 5/1990 Sherman et al. ........................ 475/207

FOREIGN PATENT DOCUMENTS 0385345 9/1990 European Pat. Off. .
0479347 4/1992 European Pat. Off. .
2659715 9/1991 France .
3542416 6/1987 Germany .
4230462 3/1993 Germany .
57-69144 4/1982 Japan .

Primary Examiner—Dirk Wright
Attorney, Agent, or Firm—Birch, Stewart, Kolasch & Birch, LLP

[57] ABSTRACT

A gear train of an automatic five-speed transmission includes an input shaft for transferring the power of an engine via a torque converter, a first-speed drive gear mounted on the input shaft, a first-speed driven gear meshed with the first-drive gear to produce a reduced speed ratio, an output shaft for transferring the power received from the first-speed driven gear to a differential gear, a planetary gear unit connected with the input shaft, a first friction element selectively connected with the input shaft and output shaft for producing a first reduced speed ratio, a second friction element selectively connected with the input shaft for transferring the input power through a first power transfer member to a first sun gear of the planetary gear unit to produce a second reduced speed ratio, a third friction element selectively connected with the input shaft for transferring the input power through a second power transfer member to the planetary carrier of the planetary gear unit serving as an input element, and a fourth friction element for gripping a third power transfer member to employ as a reacting element a second sun gear receiving the rotational force of the first sun gear of the planetary gear unit serving as an input element.

8 Claims, 4 Drawing Sheets

◉ NOT APPLIED DURING COASTING

| RANGES | | C1 | C2 | C3 | C4 | C5 | B1 | B2 | F1 | F2 | ENGINE BRAKE |
|---|---|---|---|---|---|---|---|---|---|---|---|
| P | | | | | | | | | | | |
| R | | | | | | ○ | | ○ | | | YES |
| N | | | | | | | | | | | NO |
| V | 1 | ○ | | | | | | | ○ | | NO |
| V | 2 | ○ | ○ | | | | | | | ○ | NO |
| V | 3 | ○ | ○ | | | | ○ | | | | YES |
| V | 4 | ○ | ○ | ○ | | | | | | | YES |
| V | 5 | ○ | | ○ | | | ○ | | | | YES |
| IV | 1 | ○ | | | | | | | ○ | | NO |
| IV | 2 | ○ | ○ | | | | | | | ○ | NO |
| IV | 3 | ○ | ○ | | | | ○ | | | | YES |
| IV | 4 | ○ | ○ | ○ | | | | | | | YES |
| III | 1 | ○ | | | | | | | ○ | | NO |
| III | 2 | ○ | ○ | | | | | | | ○ | NO |
| III | 3 | ○ | ○ | | | | ○ | | | | YES |
| II | 1 | ○ | | | | | | | ○ | | NO |
| II | 2 | ○ | ○ | | | | | ○ | | | YES |
| L | 1 | ○ | | | ○ | | | | ◉ | | YES |

FIG.2

| RANGES | | FRICTION ELEMENTS | | | | | | ENGINE BRAKE |
|---|---|---|---|---|---|---|---|---|
| | | C11 | C13 | C15 | B12 | B14 | B16 | |
| P | | | | | | | | NO |
| R | | | | ○ | | ○ | | YES |
| N | | | | | | | | NO |
| V | 1 | | | | ○ | | | YES |
| | 2 | ○ | | | | ○ | | YES |
| | 3 | ○ | | | | | ○ | YES |
| | 4 | ○ | ○ | | | | | YES |
| | 5 | | ○ | | | | ○ | YES |

GEAR TRAIN OF AN AUTOMATIC FIVE-SPEED TRANSMISSION FOR A VEHICLE

BACKGROUND OF THE INVENTION

1. Field of the Invention

The present invention concerns a gear train of an automatic five-speed transmission for a vehicle and more particularly a gear train for obtaining five steps of forward moving speed and one step of backward moving speed according to driving conditions.

2. Description of Related Art

Conventionally, an automatic transmission for a vehicle includes a planetary gear unit connected between a torque converter and a driven shaft, which planetary gear unit comprises sun gears, a plurality of planetary gears, a planetary carrier for carrying the planetary gears, and a ring gear.

A plurality of clutches and friction elements are controlled to selectively grip the gears of the planetary gear unit so as to obtain a target speed. As is well known, such a conventional automatic transmission has an insufficient fuel consumption ratio or power or driving performance particularly in a high speed engine. Hence, there has been proposed a multistage control of speed in order to maximize the performance of a high speed engine.

Meanwhile, the multi-stage speed control of a transmission is preferably required using a minimum number of friction elements to facilitate the speed control. In addition, it is preferable to minimize the number of the friction elements in order to reduce volume and weight. In this respect, U. S. Pat. No. 5,112,285 discloses a multi-stage speed control of a transmission, wherein a speed change may be obtained by shifting the frictional grip from one element to another. This patent requires a large number of friction elements thereby increasing the volume and weight of the vehicle.

SUMMARY OF THE INVENTION

It is an object of the present invention to provide a gear train of an automatic multi-stage speed control transmission for improving engine performance.

It is another object of the present invention to provide means for facilitating the control of the gear train of the multi-stage transmission.

It is still another object of the present invention to provide a gear train of an automatic transmission having a reduced number of gears to decrease the volume and weight of the automatic transmission.

According to an aspect of the present invention, a gear train of an automatic five-speed transmission comprises:

input means for transferring the power of an engine via a torque converter;

a first-speed drive gear mounted on the input means;

a first-speed driven gear meshed with the first-speed drive gear to produce a reduced speed ratio;

output means for transferring the power received from the first-speed driven gear to a differential gear;

a planetary gear unit connected with the input means;

a first friction element selectively connected with the input means and output means for producing a first reduced speed ratio;

2 a second friction element selectively connected with the input means for transferring the input power through a first power transfer member to a first sun gear of the planetary gear unit to produce a second reduced speed ratio;

a third friction element selectively connected with the input means for transferring the input power through a second power transfer member to the planetary carrier of the planetary gear unit serving as an input element; and a fourth friction element for gripping a third power transfer member to employ as a reacting element a second sun gear receiving the rotational force of the first sun gear of the planetary gear unit serving as an input element.

In one embodiment, a sixth friction element is directly connected with the first driven gear and output means for breaking the engine during the first speed.

In a further embodiment, a first one-way clutch is connected with the first friction element and output means to obtain a counter-clockwise rotation with respect to the engine side.

In a still further embodiment, the one-way clutch is idling by working the sixth friction element.

In a still further embodiment, a second one-way clutch is preferably connected with the planetary carrier so as to prevent its counter-clockwise rotation with respect to the engine.

In a still further embodiment, the planetary gear unit produces a reduced reverse speed ratio by working the seventh friction element for transferring the input rotational force to the second sun gear and the fifth friction element for gripping the planetary carrier.

In a still further embodiment, the planetary gear unit is so designed that the second and third friction elements directly connect the first sun gear and the planetary carrier to work together as an input element to obtain the same rotational speed ratio of the output as the input.

According to another aspect of the present invention, a gear train of an automatic five-speed transmission comprises:

input means for transferring the power of an engine via a torque converters a planetary gear unit connected with the input means including a planetary carrier and a first planetary gear means with first and second pinion gears, which second pinion gear serves as a pinion gear of a second planetary gear means, the first planetary gear means having a first ring gear and a first sun gear, and the second planetary gear means having a second sun gear;

a first friction element connected with the input means for transferring the input power to the first sun gear of the first planetary gear means through a first power transfer member;

a second friction element for causing the first ring gear of the first planetary gear means to selectively serve as a reacting element;

a third friction element selectively connected with the input means for causing the planetary carrier connecting the first and second pinion gears to selectively serve as an input element;

a fourth friction element for causing the planetary carrier to selectively serve as a reacting element;

a fifth friction element connected with the input means for transferring the input power to the second sun gear of the second planetary gear means through a second power transfer member; and a sixth friction element for causing the second sun gear of the second planetary gear means to selectively serve as a reacting element.

BRIEF DESCRIPTION OF THE ATTACHED DRAWINGS

FIG. 2 is a table for showing the operation of the friction elements according to the six steps of forward five speed ratios and backward one speed ratio in the gear train of. FIG. 1;

FIG. 4 is a table for showing the operation of the friction elements according to the six steps of forward five speed ratios and backward one speed ratio in the gear train of FIG. 3.

The present invention will now be described more specifically with reference to the drawings attached only by way of example.

DETAILED DESCRIPTION OF THE PREFERRED EMBODIMENTS

Figure 1:
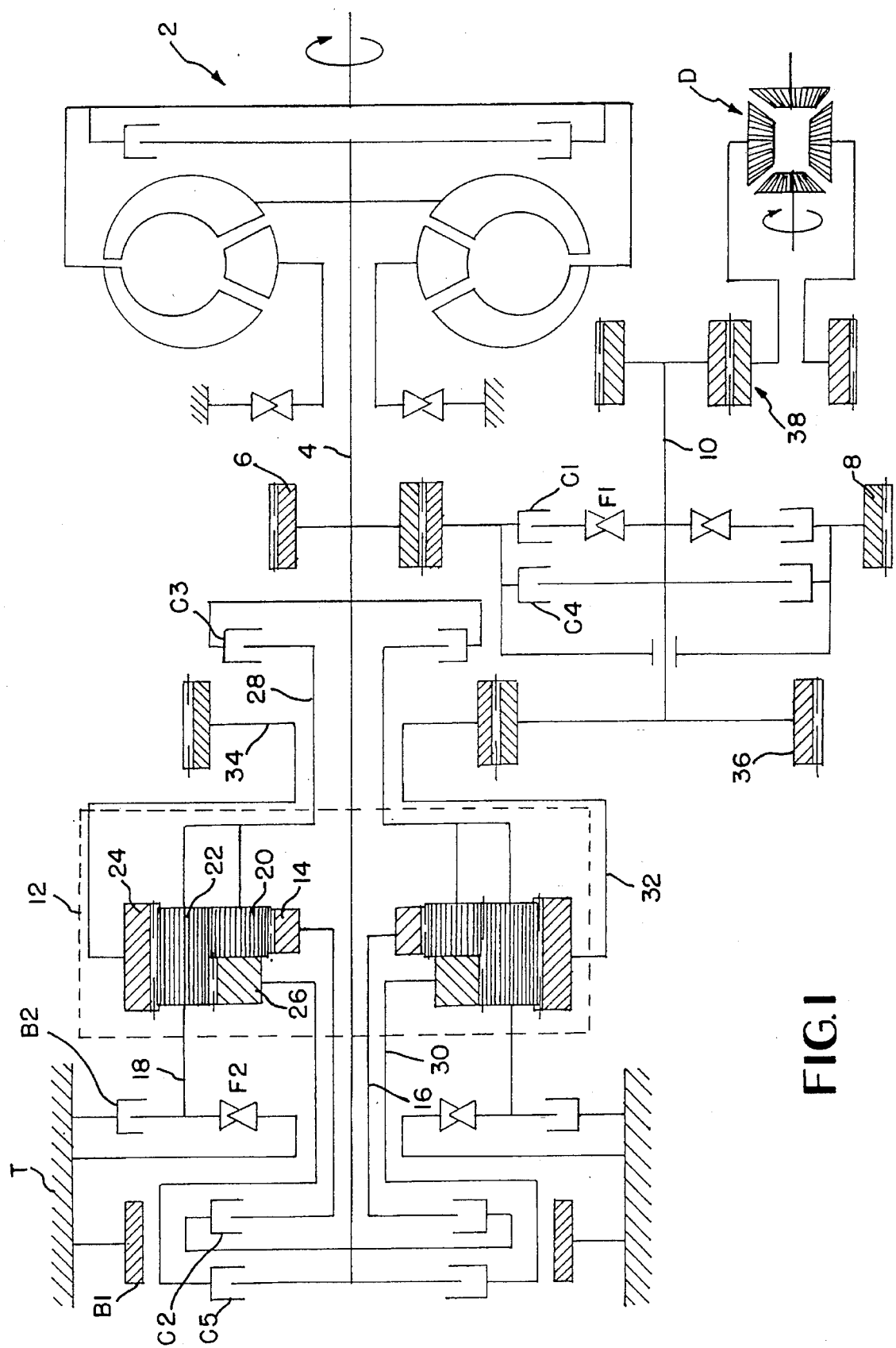
FIG. 1 is a schematic diagram for illustrating the gear train of an automatic five-speed transmission according to an embodiment of the present invention.

Referring to FIG. 1, a transmission according to an embodiment of the present invention includes an input shaft 4 connected with an engine (not shown) through a torque converter 2, a first speed drive gear 6 mounted on the input shaft 4, and a first speed driven gear 8 meshed with the first speed drive gear 6 for transferring the rotational driving force to a differential gear D. The first speed drive and driven gears 6 and 8 provide a first speed according to their tooth ratio.

Between the first driven gear 8 and an output shaft 10 is provided a first friction element C1 for connecting the rotational driving force of the input shaft 4 to the output shaft 10. In addition, a one-way clutch F1 is provided between the first friction element C1 and the output shaft 10 to reduce the gear shift shock. The first one-way clutch F1 is designed to receive the engine power counter-clockwise with respect to the engine, so that the coasting torque of a vehicle is not transferred to the engine in the first speed.

The gear train also includes a planetary gear unit 12 with a first sun gear 14 mounted on a first power transfer member 16, which may be operatively connected with the input shaft 4 by working a second friction element C2 to transfer the rotational driving force of the input shaft 4 to the first sun gear 14 and thus to the planetary gear unit 12 with a planetary carrier 18. The planetary carrier 18 is designed to receive the rotational driving force counter-clockwise with respect to the engine, but the rotation counter-clockwise may be prevented by working a second one-way clutch F2.

The planetary gear unit 12 further comprises a first pinion gear 20 meshed with the first sun gear 14, a second pinion gear 22 meshed with the first pinion gear 20, a ring gear 24 internally meshed with the second pinion gear 22, and a second sun gear 26 meshed with the second pinion gear 22. The first and second pinion gears 20 and 22 are connected with each other with a given interval by the planetary carrier 18, which receives the rotational driving force of the input shaft 4 via a second power transfer member 28. A third friction element C3 is provided to selectively transfer the rotational driving force of the input shaft 4 to the second power transfer member 28. When the third friction element C3 is worked to grip the second power transfer member 28, a fourth friction element B1 mounted on the inside of the housing T of the transmission may be worked to check a third power transfer member 30 thus fixing the second sun gear 26 of the planetary gear unit 12. The fourth friction element B1 may be a kind of band break to grip the periphery of the third power transfer member 30 stopping its rotation. A fifth friction element B2 is mounted on the inside of the housing T of the transmission to prevent the planetary carrier 18 from being rotated clockwise with respect to the engine, so that it may be used to transfer a reversely driving torque of a gear to the engine in a gear shift.

An output drum member 32 integrally formed with the ring gear 24 is provided with a transfer drive gear 34, which is meshed with a transfer driven gear 36 mounted on the output shaft 10 to transfer the speed ratio of the planetary gear unit 12. The output shaft 10 is designed to be gripped by a sixth friction element C4 in the forward first speed so as to transfer the reversely driving torque to the engine through the first drive and driven gears 6 and 8. Between the input shaft 4 and the third power transfer member 30 is provided a seventh friction element C5 used to reverse the vehicle, through which the rotational force of the input shaft is transferred to the second sun gear 26 of the planetary gear unit 12.

An end reduction gear 38 is provided between the output shaft 10 and the differential gear D. Thus, as shown in FIG. 2, the friction elements and one-way clutches, which are hydraulically controlled, are used to produce various speed ratios. In the reverse speed ratio R, the seventh and fifth friction elements C5 and B2 are worked to transfer the rotational force of the input shaft 4 to the third power transfer member 30 thus rotating the second sun gear 26 of the planetary gear unit 12. Meanwhile, the fifth friction element B2 fixes the planetary carrier 18 so that the second pinion gear 22 rotates only on its axis to rotate the ring gear 24 counter-clockwise with respect to the engine, thereby obtaining the reverse speed ratio. The rotational force of the ring gear 24 is transferred to the differential gear D through the output drum member 32, drive and driven gears 34 and 36, output shaft 10, and end reduction gear 38.

In the first forward speed ratio V1, the first friction element C1 is worked to transfer the rotational force of the input shaft 4 to the output shaft 10 through the first drive and driven gears 6 and 8. In this case, the first one-way clutch F1 makes the rotational force work counter-clockwise with respect to the engine. The engine is also prevented from being reversely driven (engine brake) because the first one-way clutch F1 freewheels when driving in reverse.

In the second forward speed ratio V2, the second friction element C2 is worked in addition to the first friction element C1 so that the rotational force of the input shaft 4 is transferred to the first power transfer member 16 rotating the first sun gear 14 of the planetary gear unit 12. The first sun gear 14 tries to force the planetary carrier 18 counter-clockwise with respect to the engine via the first and second pinion gears 20 and 22, but the second one-way clutch F2 checks the counter-clockwise rotation of the planetary carrier 18 to serve as a reacting element, which causes the second pinion gear 22 to rotate only on its axis so that the ring gear 24 is rotated clockwise with respect to the engine producing the second forward speed ratio through the output drum member 32. The rotational force is transferred to the differential gear D through the transfer drive and driven gears 34 and 36, output shaft 10, and the end reduction gear

38, driving the vehicle faster than in the first forward speed ratio. The second one-way clutch F2 freewheels during the reverse drive, so that the engine brake is not worked.

In the third forward speed ratio V3, the fourth friction element B1 is worked in addition to the state of the second forward speed ratio to brake the third power transfer member 30, thus causing the second sun gear 26 to serve as a reacting element. The planetary gear unit 12 receiving the input via the first sun gear 14 produces the third forward speed ratio less than the second forward speed ratio through the first and second pinion gears 20 and 22 and the ring gear 24 because the second pinion gear 22 rotates along the periphery of the second sun gear 26 fixed. In this case, the reverse drive torque is transferred to the input shaft 4 so as to more quickly reduce the vehicle speed during coasting.

In the fourth forward speed ratio V4, the fourth friction element B1 is released and the third friction element C3 is worked again, 80 that the first sun gear 14 and the planetary carrier 18 simultaneously serve as input elements and therefore the planetary gear unit 12 is rotated as a whole to produce the output with the same number of rotations as the input. In this case, the engine brake is also workable to quickly reduce the vehicle speed during coasting.

In the fifth forward speed ratio V5, the second friction element C2 is released and the fourth friction element B1 is worked again to brake the third power transfer member 30, sot hat the rotational force of the input shaft 4 is transferred to the planetary gear unit 12 through the third friction element C3 and the planetary carrier 18. Meanwhile, the second sun gear 26 is fixed serving as a reacting element, so that the second pinion gear 22 rotates along the periphery of the second sun gear 26 with the same speed as the planetary carrier 18. Thus the Ting gear 24 receives the sum of the rotations that the second pinion gear 22 makes on its own axis and along the periphery of the second sun gear 26, thereby producing the overdrive state of the fifth forward speed ratio. Of course, the engine brake is workable to quickly reduce the vehicle speed.

The four speed ratios of the forward four-speed range IV are obtained in the same manner as the four speed ratios of the forward five-speed range V. Likewise, the three speed ratios of the forward three-speed range III are obtained in the same manner. Of course, the first speed ratio of the forward two-speed range II is obtained in the same manner, but its second speed ratio is obtained by working the engine brake, wherein the reverse drive torque of the engine is produced as follows.

In the speed range II, the second speed ratio is obtained by applying the first and second friction elements C1 and C2 and the fifth friction element B2, so that the planetary carrier 18 is fixed to reversely transfer the driven power of the wheels to the engine during coasting, thus amplifying the reverse drive torque which affects the drive wheel and is divided the radius of the drive wheel to calculate the driving resistance.

In the forward one-speed range L, the one speed ratio is obtained by applying the first and sixth friction elements C1 and C4, which is different from the other speed ranges. This means that the rotational force of the input shaft 4 is transferred to the output shaft 10 through the transfer drive and driven gears 6 and 8. Hence, the engine brake is applied to produce reverse drive power. In this case, the first one-way clutch F1 does nothing.

Thus the gear train described above according to an embodiment of the present invention gives the engine brake effect in all speed ranges, and employs a planetary gear unit of the Ravigneaux type to obtain five speed ratios simplifying the structure and increasing the engine performance. Moreover, one of the second and fourth friction elements C2 and B1 is controlled to make a gear shift between the first and second speed or the second and third speed ratios, thus facilitating the control of the speed-changing gears.

Figure 3:
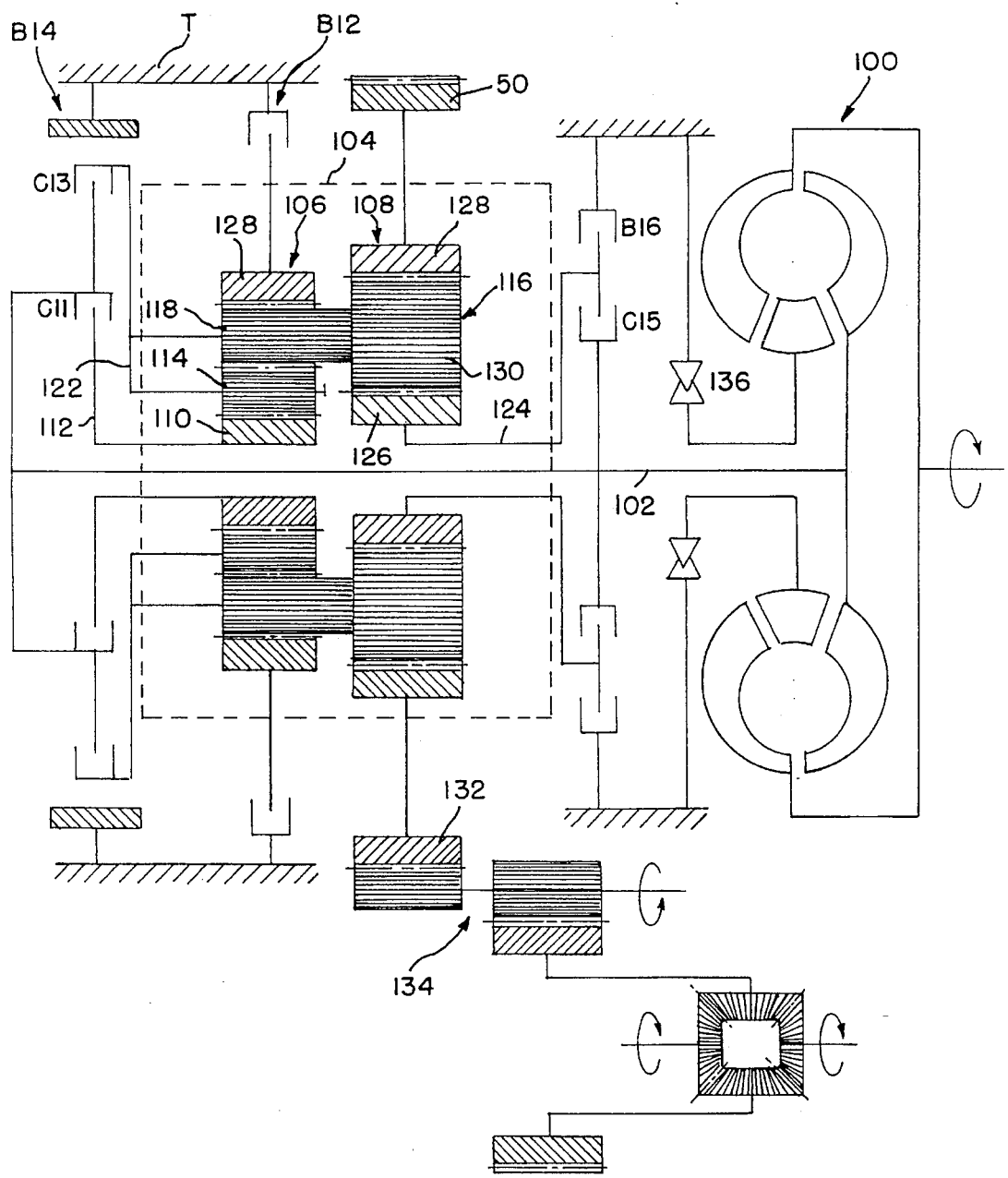
FIG. 3 is a schematic diagram for illustrating the gear train of an automatic five-speed transmission according to another embodiment of the present invention.

Referring to FIG. 3 for illustrating the gear train with a double pinion planetary gear unit according to another embodiment of the present invention, the gear train comprises an input shaft 102 for receiving the power of an engine via a torque converter 100 and a planetary gear unit 104 connected with the input shaft 102.

The planetary gear unit 104 includes a first double pinion planetary gear means cooperating with a second planetary single pinion gear means 106 and 108. The first planetary gear means 106 has a first sun gear 110 connected with the input shaft 102 via a first power transfer member 112 for receiving the rotational force of the input shaft 102 by applying a first friction element C11. The first sun gear 110 is meshed with a first pinion gear 114, which is also meshed with the small diameter part 118 of a second pinion gear 116. The small diameter part 118 is also meshed with the inside of a ring gear 120, which is checked by a second friction element B12 mounted on the inside of the housing of a transmission serving as a reacting element during a first forward speed.

The first and second pinion gears 114 and 116 are connected together with a planetary carrier 122, which is operatively connected with the first power transfer member 112 by applying a third friction element C13 for a fourth or fifth forward speed. The third friction element C13 is operatively connected with a fourth friction element B14 mounted on the inside of the housing T of the transmission for the second forward speed.

The second planetary gear means 108 includes a second sun gear 126 mounted on a second power transfer member 124, which sun gear 126 is rotated by applying a fifth friction element C15. Between the second sun gear 126 and a second ring gear 128 is cooperatively interposed the large diameter part 130 of the second pinion gear 116 of the first planetary gear means 106. The second ring gear 128 is connected with a transfer drive gear 132, of which the rotational force is transmitted to a differential gear D through a transfer gear 134. The second power transfer member 124 is gripped by a sixth friction element B16 mounted on the inside of the housing T to obtain the third or fifth forward speed radio. In addition, a one-way clutch 136 is provided to prevent the stator of the torque converter 100 from being rotated in the reverse direction of the engine rotation.

According to the table of FIG. 4, the gear train is operated to produce the forward five and reverse one speed ratios.

In the reverse speed range R, the fourth and fifth friction elements B14 and C15 are applied to produce the reverse speed. The fifth friction element C15 is applied to cause the input shaft 102 to drive the second sun gear 126 of the second planetary gear means 108 through the second power transfer member 124. Then the second pinion gear 116 is rotated in the reverse direction of the engine rotation so as to rotate the second ring gear 128 and thus the transfer drive gear 132 in the reverse direction because the fourth friction element B14 is applied causing the planetary carrier 122 of the second pinion gear 116 to serve as a reacting element. Thus, the transfer drive gear 132 drives the differential gear D via the transfer gear 134 thereby moving the vehicle in a reverse direction.

In the first forward speed V1, the first and second friction elements C11 and B12 are applied in order to transmit the rotational force of the input shaft 102 to the first power transfer member 112 driving the first sun gear 110 of the first planetary gear means 106. Then, the first and second pinions 114 and 116 are driven so as to rotate the planetary carrier 122 in the reverse direction of the engine rotation driving the second planetary gear means 108 via the second pinion 116 because the first ring gear 120 is braked by the second friction element B12. Consequently, the large diameter part 130 of the second pinion 116 travels along the periphery of the second sun gear 126 so that the second ring gear 128 is driven to rotate the transfer drive gear 132 in the direction of the engine rotation. Hence the transfer drive gear 132 drives the differential gear D via the transfer gear 134 moving the vehicle at the first forward speed ratio.

In the second forward speed V2, while the first friction element C11 is kept in operation, the fourth friction element B14 is applied. Then the rotational force of the input shaft 102 is transmitted to the first power transfer member 112 through the first friction element C11 driving the second sun gear 110 of the first planetary gear means 106, so that the first and second pinions 114 and 116 are driven to rotate the first ring gear 120 in the direction of the engine rotation because of the planetary carrier 122 being braked by the application of the fourth friction element B14. Simultaneously, in the second planetary gear means 108, the large diameter part 130 of the second pinion 116 rotates along the periphery of the second sun gear 126 driving the second ring gear 128 so as to rotate the transfer drive gear 132 in the direction of the engine rotation. Meanwhile the second sun gear 126 is rotated in the reverse direction of the engine rotation. Consequently the transfer drive gear 132 drives the differential gear D via the transfer gear 134 moving the vehicle at the second forward speed ratio.

In the third forward speed V3, the sixth friction element B16 is applied while the first friction element C11 is kept in operation. Then the rotational force of the input shaft 182 is transmitted to the first power transfer member 112 through the first friction element C11 driving the first sun gear 110 of the first planetary gear means 106, which rotates the first and second pinions 114 and 116 driving the second planetary gear means 108. The two pinions 114 and 116 rotate on their axes while travelling along the periphery of the first sun gear 110. Successively, the large diameter part 130 of the second pinion 116 drives the second ring gear 128 faster than the second forward speed to rotate the transfer drive gear 132 in the direction of the engine rotation because of the second sun gear 126 being braked by the application of the sixth friction element B16. As a result, tho transfer drive gear 132 drives the differential gear D via the transfer gear 134 moving the vehicle at the third forward speed ratio.

In the fourth forward speed V4, the third friction element C13 is applied while the first friction element C11 is kept in operation. Then, the rotational force of the input shaft 102 is simultaneously transmitted to the second power transfer member 112 and the planetary carrier 122 through the first and third friction elements C11 and C13 locking the planetary gear unit 104. Then, the rotational force of the input shaft 102 is directly transmitted to the transfer drive gear 132, which rotates at the same speed as the engine rotation driving the differential gear D via the transfer gear 134, thus moving the vehicle at the fourth forward speed ratio.

In the fifth forward speed V5, the third friction element C13 and the sixth brake B16 are applied to transmit the rotational force of the input shaft 102 to the first planetary gear means 106 through the third friction element C13 and the planetary carrier 122, so that the first and second pinions 114 and 116 are rotated on their own axes while travelling along the periphery of the first sun gear 110. Thus the second pinion gear 116 tries to move the second sun gear 126 of the second planetary gear means 108 in the reverse sun gear 126 is fixed by the sixth friction element B16, direction of the engine rotation. However, the second so that the large diameter part 130 of the second pinion 116 increases the rotational speed of the second ring gear 128 in addition to the rotational speed made by the first planetary gear means. Thus, the transfer drive gear 132 is rotated faster than the fourth speed moving the vehicle at the fifth forward speed ratio.

In this embodiment, the gear train involves no one-way clutch in the power transmission path and the reverse driving force applied by the drive wheel at the five forward speed ratios and one reverse speed ratio R is fully transmitted to the engine, thus working the engine brake. Conclusively, the present gear train involves only a double pinion planetary gear system and six friction elements (three clutches and three brakes) to obtain the five forward speed ratios and a backward speed ratio, simplifying the structure to reduce the size and weight thereof.

What is claimed is:

1. A gear train of an automatic five-speed transmission comprising:

input means for transferring the power of an engine via a torque converter;

a first-speed drive gear mounted on said input means;

a first-speed driven gear meshed with said first-drive gear to produce a reduced speed ratio;

output means for transferring the power received from said first-speed driven gear to a differential gear;

a planetary gear unit connected with said input means;

a first friction element selectively connected with said input means and output means for producing a first reduced speed ratio;

a second friction element selectively connected with said input means for transferring the input power through a first power transfer member to a first sun gear of said planetary gear unit to produce a second reduced speed ratio;

a third friction element selectively connected with said input means for transferring the input power through a second power transfer member to a planetary carrier of said planetary gear unit serving as an input element; and a fourth friction element for gripping a third power transfer member to employ as a reacting element a second sun gear receiving the rotational force of said first sun gear of said planetary gear unit serving as an input element.

2. The gear train of an automatic five-speed transmission as defined in claim 1, wherein a sixth friction element is directly connected with said first driven gear and output means for breaking said engine during said first speed.

3. The gear train of an automatic five-speed transmission as defined in claim 1, wherein a first one-way clutch is connected with the first friction element and output means to obtain a counter-clockwise rotation with respect to said engine.

4. The gear train of an automatic five-speed transmission as defined in claim 3, wherein said first one-way clutch is designed to idle by applying a sixth friction element.

5. The gear train of an automatic five-speed transmission as defined in claim 1, wherein a second one-way clutch is connected with said planetary carrier so as to prevent its counter-clockwise rotation with respect to said engine.

6. The gear train of an automatic five-speed transmission as defined in claim 1, wherein said planetary gear unit is designed to produce a reduced reverse speed ratio by applying a seventh friction element for transferring the input rotational force to said second sun gear and a fifth friction element for gripping said planetary carrier.

7. The gear train of an automatic five-speed transmission as defined in claim 1, wherein said fourth friction element is a band brake.

8. The gear train of an automatic five-speed transmission as defined in claim 1, wherein said planetary gear unit is so designed that said second and third friction elements directly connect said first sun gear and said planetary carrier to work together as an input element to obtain the same rotational speed ratio of said output as said input.

* * * * *